United States Patent
Barada (10) Patent No.: US 9,388,854 B2
(45) Date of Patent: Jul. 12, 2016

(54) MAGNETIC BEARING APPARATUS AND METHOD FOR REDUCING VIBRATION CAUSED BY MAGNETIC BEARING APPARATUS

(71) Applicant: EBARA CORPORATION, Tokyo (JP)

(72) Inventor: Toshimitsu Barada, Tokyo (JP)

(73) Assignee: EBARA CORPORATION, Tokyo (JP)

(*) Notice: Subject to any disclaimer, the term of this patent is extended or adjusted under 35 U.S.C. 154(b) by 429 days.

(21) Appl. No.: 14/101,248

(22) Filed: Dec. 9, 2013

(65) Prior Publication Data

US 2014/0175925 A1    Jun. 26, 2014

(30) Foreign Application Priority Data

Dec. 10, 2012 (JP) .................. 2012-269120

(51) Int. Cl.
*F16C 32/04*    (2006.01)

(52) U.S. Cl.
CPC ......... *F16C 32/0451* (2013.01); *F16C 32/0442* (2013.01); *F16C 32/0446* (2013.01); *F16C 2233/00* (2013.01)

(58) Field of Classification Search
CPC ............ F16C 32/0442; F16C 32/0446; F16C 32/0451; F16C 2233/00
USPC ............................................. 310/90.5, 68 B
See application file for complete search history.

(56) References Cited

U.S. PATENT DOCUMENTS 4,947,067 A * 8/1990 Habermann .......... F16F 7/1011
                                                                    244/170
5,027,280 A * 6/1991 Ando ........................ B23Q 1/70
                                                                    310/90.5

(Continued)

FOREIGN PATENT DOCUMENTS

| EP | 0740141 A2 | 10/1996 |
|---|---|---|
| JP | H06-193631 | 7/1994 |
| JP | H07-020359 | 1/1995 |

(Continued)

OTHER PUBLICATIONS

European Patent Application No. 13020134.6; Extended European Search Report; dated Oct. 28, 2014; 4 pages.

*Primary Examiner* — Alex W Mok
(74) *Attorney, Agent, or Firm* — Baker & Hostetler LLP (57) ABSTRACT

A magnetic bearing apparatus for supporting a rotational shaft includes a magnetic bearing, a rotation sensor, a controller which controls an electric current flown to an electromagnet, and at least one vibration sensor. The controller controls the electric current flown to the electromagnet as follows: in a first control mode, a first electric current is flown to the electromagnet for levitating and supporting the rotational shaft; and in a second control mode, a second electric current is flown to the electromagnet in place of the first electric current at a first periodic timing which is detected by the rotation sensor so that vibration is reduced to a lower level than a first vibration value detected in the first control mode in at least one of setting location of the at least one vibration sensor.

12 Claims, 4 Drawing Sheets

(56) References Cited

U.S. PATENT DOCUMENTS

| | | | |
|---|---|---|---|
| 5,347,190 A * | 9/1994 | Lewis | F16C 32/0455 310/68 B |
| 5,760,510 A | 6/1998 | Nomura et al. | |
| 6,005,315 A | 12/1999 | Chapman | |
| 6,590,366 B1 * | 7/2003 | Browning | F16C 32/0451 310/90.5 |
| 6,911,754 B2 * | 6/2005 | Johnson | F16F 15/03 310/51 |
| 7,038,429 B2 * | 5/2006 | Browning | F16C 32/0451 310/90 |
| 2002/0074883 A1 * | 6/2002 | Yamauchi | F16C 32/0444 310/90.5 |
| 2008/0290761 A1 * | 11/2008 | Eckert | H02K 11/20 310/68 B |

FOREIGN PATENT DOCUMENTS

| | | |
|---|---|---|
| JP | H09-280250 | 10/1997 |
| JP | 2008-095746 A | 4/2008 |

\* cited by examiner

| Vibration value reference position | | default | c,d | f,g | a,e | b,e |
|---|---|---|---|---|---|---|
| rotation speed | [min⁻¹] | 4750 | 4750 | 4750 | 4750 | 4750 |
| measuring position a | [mG$_{p-p}$] | 4.523 | 7.847 | 2.679 | 2.050 | 2.512 |
| measuring position b | [mG$_{p-p}$] | 5.772 | 19.015 | 3.010 | 18.487 | 0.490 |
| measuring position c | [mG$_{p-p}$] | 4.228 | 0.893 | 5.616 | 4.969 | 3.910 |
| measuring position d | [mG$_{p-p}$] | 3.748 | 0.853 | 7.426 | 5.877 | 6.256 |
| measuring position e | [mG$_{p-p}$] | 4.204 | 8.187 | 5.040 | 2.346 | 0.218 |
| measuring position f | [mG$_{p-p}$] | 2.736 | 4.610 | 0.562 | 0.481 | 2.932 |
| measuring position g | [mG$_{p-p}$] | 8.126 | 19.302 | 0.345 | 17.317 | 3.364 |

FIG. 4

MAGNETIC BEARING APPARATUS AND METHOD FOR REDUCING VIBRATION CAUSED BY MAGNETIC BEARING APPARATUS

CROSS-REFERENCE TO RELATED APPLICATIONS

This application claims priority under 35 U.S.C. 119 on Patent Application No. 2012-269120 filed in Japan on Dec. 10, 2012, the disclosure of which is hereby incorporated by reference herein in its entireties.

TECHNICAL FIELD

The present invention relates to a technology for reducing vibration caused by a magnetic bearing apparatus.

BACKGROUND ART

A magnetic bearing apparatus supports a rotational shaft in a contactless fashion through magnetic levitation by using a magnetic force generated by flowing an electric current to an electromagnet. In the magnetic bearing apparatus, when the balance of the rotational shaft is not good, the whirling of the rotational shaft is increased, and a large controlling reaction force against an electromagnetic vibration force is applied to a stator. This results in fears that vibration caused by the controlling reaction force affects badly equipment which utilizes the rotation of the rotational shaft. For example, when a magnetic bearing apparatus is used in a turbo molecular pump which is disposed on the periphery of an apparatus such as an exposure apparatus or an electron microscope which is apt to be badly affected by vibration, there are fears that vibration caused by the magnetic bearing apparatus is transmitted to the peripheral apparatus via a stator or a fixed frame. To deal with this situation, the technologies of correcting the imbalance of the rotational shaft have been developed (for example, JPH6-193631A).

However, it is difficult to eliminate the imbalance of the rotational shaft completely, and in reality, the imbalance of the rotational shaft is permitted to some extent. Because of this, it is difficult to prevent completely the vibration caused by the magnetic bearing apparatus from being transmitted to a constituent component of a apparatus which is situated within an influential range of the magnetic bearing apparatus such as, for example, a casing of the magnetic bearing apparatus and an apparatus on the periphery of the magnetic bearing apparatus (for example, the exposure apparatus or the electron microscope which is described above). Moreover, vibration which does not constitute a problem when the rotational shaft rotates at low speeds sometimes constitutes a problem when the rotational shaft rotates at high speeds. On the contrary, vibration which does not constitute a problem when the rotational shaft rotates at high speeds sometimes constitutes a problem when the rotational shaft rotates at low speeds. The transmission properties of vibration to the constituent component within the influential range depend upon how the constituent component is connected or supported, and therefore, it is difficult to predict, at a specific location where vibration is caused, a magnitude of vibration caused in the constituent component which is situated within the influential range of the magnetic bearing apparatus. When the rotational shaft is balanced mechanically, normally a weight is attached to a balancing plane which is provided on the rotational shaft or the balancing plane is cut by a drill or the like. However, when only a narrow space is available, when it is difficult to expose the correcting surface due to corrosion or the like, or when a person cannot touch the balancing plane due to the polluted environment or the like, it is difficult to balance the rotational shaft mechanically.

SUMMARY

According to a first embodiment of the invention, there is provided a magnetic bearing apparatus for supporting a rotational shaft. This magnetic bearing apparatus includes a magnetic bearing for supporting the rotational shaft in a contactless fashion through magnetic levitation by using an electromagnetic force which is generated by an electric current flown to an electromagnet; a rotation sensor for detecting the rotation of the rotational shaft; a controller for controlling the electric current flown to the electromagnet; and at least one vibration sensor which is provided within an influential range of vibration which is generated by the rotation of the rotational shaft. The controller controls the electric current flown to the electromagnet as follows: in a first control mode, a first electric current is flown to the electromagnet for levitating and supporting the rotational shaft; and in a second control mode, a second electric current is flown to the electromagnet in place of the first electric current at a first periodic timing which is detected by the rotation sensor so that vibration is reduced to a lower level than a first vibration value detected in the first control mode in at least one of setting location of the at least one vibration sensor.

DESCRIPTION OF EMBODIMENTS

A. Embodiment

According to this magnetic bearing apparatus, in comparison with the control in the first control mode, in the control in the second control mode, the electromagnetic force which acts on the rotational shaft is applied by the second electric current at the first periodic timing, whereby the behavior of the rotational shaft in the first control mode is corrected. This electromagnetic force is applied so that the vibration in at least one setting location of the vibration sensor is reduced. Consequently, in the event that the vibration sensor is set in a location where vibration is desired to be reduced within the influential range of vibration which is generated by the rotation of the rotational shaft, the vibration in the desired location can preferably be reduced. The vibration caused by the whirling of the rotational shaft is generated as a wave which is in synchronization with the rotation period of the rotational shaft, and therefore, the vibration can be reduced effectively by flowing the second electric current at the first periodic timing which is in synchronization with the rotation period of the rotational shaft. It is noted that the setting location of the vibration sensor means a detecting location on an object where vibration is detected whether the vibration sensor is of a contact type or a contactless type.

According to a second embodiment of the invention, in the first embodiment, the controller controls the electric current flown to the electromagnet in a third control mode in which a third electric current which has an electric current value resulting from adding or deducting by a second value to or from the electric current value of the first electric current is flown to the electromagnet in place of the first electric current at a second periodic timing. The controller determines an electric current value of the second electric current and the first periodic timing by using an influence coefficient method based on the first vibration value; a second vibration value which is detected by the vibration sensor during the control in the third control mode; and the second value and the second periodic timing. According to the second embodiment, the electric current value of the second electric current and the first periodic timing can easily be determined.

According to a third embodiment of the invention, in the second embodiment, based on the first vibration value which is detected under an operating condition with the rotational shaft rotating at one rotational speed; the second vibration value which is detected by the vibration sensor under the operating condition with the rotational shaft rotating at the one rotation speed during the control in the third control mode; and the second value and the second periodic timing, when the number M (M is an integer equal to or larger than one) of balancing planes where unbalanced amount of the rotational shaft is corrected by using the electric current value of the second electric current and the first periodic timing in the second control mode and the number N (N is an integer equal to or larger than one) of the vibration sensor satisfy N≤M, the controller determines the electric current value of the second electric current and the first periodic timing so that the vibration value is minimized at all of the setting location of the at least one vibration sensor.

According to a fourth embodiment of the invention, in the second embodiment, based on the first vibration value which is detected under an operating condition with the rotational shaft rotating at one rotational speed; the second vibration value which is detected by the vibration sensor under the operating condition with the rotational shaft rotating at the one rotation speed during the control in the third control mode; and the second value and the second periodic timing, when the number M (M is an integer equal to or larger than one) of balancing planes where unbalanced amount of the rotational shaft is corrected by using the electric current value of the second electric current and the first periodic timing in the second control mode and the number N (N is an integer equal to or larger than one) of the vibration sensor satisfy N>M, the controller determines the electric current value of the second electric current and the first periodic timing so that a sum of squares of a vibration value at each of setting locations of N vibration sensors during the control in the second control mode under the operating condition with the rotational shaft rotating at the one rotation speed is minimized. According to the third or fourth embodiment, the vibration value can be reduced remarkably depending on the conditions of M and N.

According to a fifth embodiment of the invention, in the second embodiment, based on the individual first vibration values detected under individual operating conditions with the rotational shaft rotating at R (R is an integer equal to or larger than two) kinds of different rotation speeds; the individual second vibration values detected by the vibration sensor under the individual operating conditions with the rotational shaft rotating at the R kinds of different rotation speeds in the control in the third control mode; and the second value and the second periodic timing, when the number M (M is an integer equal to or larger than one) of balancing planes where unbalanced amount of the rotational shaft is corrected by using the electric current value of the second electric current and the first periodic timing in the second control mode, the number N (N is an integer equal to or larger than one) of the vibration sensor, and the R satisfy N×R≤M, the controller determines the electric current value of the second electric current and the first periodic timing so that the vibration value is minimized at all of the setting location of the at least one vibration sensor and under the individual operating conditions with the rotational shaft rotating at R kinds of different rotation speeds.

According to a sixth embodiment of the invention, in the second embodiment, based on the individual first vibration values detected under individual operating conditions with the rotational shaft rotating at R (R is an integer equal to or larger than two) kinds of different rotation speeds; the individual second vibration values detected by the vibration sensor under the individual operating conditions with the rotational shaft rotating at the R kinds of different rotation speeds in the control in the third control mode; and the second value and the second periodic timing, when the number M (M is an integer equal to or larger than one) of balancing planes where unbalanced amount of the rotational shaft is corrected by using the electric current value of the second electric current and the first periodic timing in the second control mode, the number N (N is an integer equal to or larger than one) of the vibration sensor, and the R satisfy N×R>M, the controller determines the electric current value of the second electric current and the first periodic timing so that a sum of squares of a vibration value at each of setting locations of N vibration sensors and under each of the individual operating conditions with the rotational shaft rotating at R kinds of different rotation speeds during the control in the second control mode is minimized. According to the fifth or sixth embodiment, the vibration value can be reduced remarkably depending on the conditions of M, N and R under any of the operating conditions with the rotational shaft rotating at the plurality of different rotation speeds.

According to a seventh embodiment of the invention, in the fourth or sixth embodiment, the controller determines the electric current value of the second electric current and the first periodic timing by weighting an influence coefficient used in the influence coefficient method. According to the seventh embodiment, the vibration can be reduced in a more flexible fashion depending on the degree of importance of the individual setting locations of the vibration sensor.

According to an eighth embodiment of the invention, in any of the second to seventh embodiments, when determining the electric current of the second electric current and the first periodic timing by the third control mode, the controller stores information which can identify the electric current value of the second electric current and the first periodic timing in a storage medium, the controller executes the control in the second control mode by using the electric current value of the second electric current and the first periodic timing which are identified from the information stored in the storage medium when the rotation speed of the rotational shaft reaches a rated rotational speed after the rotational shaft is started to rotate. According to the eighth embodiment, the control in the third control mode does not have to be executed every time the apparatus which utilizes the rotation of the rotational shaft is started. Consequently, it is possible to reduce the vibration quickly when the apparatus is started in the second time or later.

According to a ninth embodiment of the invention, in any of the first to eighth embodiments, the rotation sensor may be configured to generate one pulse every time the rotational shaft rotates a full rotation. According to this mode, a zero point (a reference point) of the rotation of the rotational shaft can be detected easily. Consequently, the first periodic timing can easily be identified.

According to a tenth embodiment of the invention, in the ninth embodiment, the rotation sensor includes a disk module which is fixed to the rotational shaft. The disk module is formed into a circular disk shape in a direction perpendicular to the rotational shaft, and is made of a magnetic material. The rotation sensor further includes: a sensor magnetic pole which is provided so as to face oppositely the disk module with a gap defined therebetween; and a sensor coil which is wound around the sensor magnetic pole, a first cutout portion where a thickness of the disk module in the direction of an axis thereof is reduced is formed on a first surface which is a surface of a side of the disk module which faces oppositely the sensor magnetic pole, a second cutout portion having the same shape as that of the first cutout portion is formed on a second surface which is a surface of a side of the disk module which is opposite to the first surface in a position which is 180 degrees rotationally symmetric with the first cutout portion about the axis. According to the tenth embodiment, one pulse can be generated every time the rotational shaft rotates one full rotation without badly affecting the rotation balance of the rotational shaft.

According to an eleventh embodiment of the invention, there is provided a method for reducing vibration caused by a magnetic bearing apparatus which supports a rotational shaft. This method includes: (i) supporting the rotational shaft in a contactless fashion through magnetic levitation by flowing a first electric current with which the rotational shaft is levitated and supported to an electromagnet of the magnetic bearing apparatus and using an electromagnetic force which is generated by the first electric current flown to the electromagnet; (ii) detecting vibration by at least one vibration sensor which is provided within an influential range of vibration which is generated by the rotation of the rotational shaft in the (i) supporting the rotational shaft; and (iii) supporting the rotational shaft in a contactless fashion through magnetic levitation by flowing a second electric current to the electromagnet in place of the first electric current and using an electromagnetic force generated by the second electric current flown to the electromagnet at a predetermined periodic timing so that vibration is reduced to a lower level than a vibration value detected during the (i) supporting the rotational shaft in at least one of setting location of the at least one vibration sensor. The second electric current has an electric current value resulting from adding or deducting by a specific value to or from an electric current value of the first electric current. According to this method, the same advantage as that provided by the first embodiment is provided. It is possible to apply any of the second to tenth embodiments to the eleventh embodiment.

According to a twelfth embodiment of the invention, there is provided a magnetic bearing apparatus for supporting a rotational shaft. This magnetic bearing apparatus includes a magnetic bearing for supporting the rotational shaft in a contactless fashion through magnetic levitation by using an electromagnetic force which is generated by an electric current flown to an electromagnet; a rotation sensor for detecting the rotation of the rotational shaft; a controller for controlling the electric current flown to the electromagnet; and at least one vibration sensor which is provided within an influential range of vibration which is generated by the rotation of the rotational shaft. The controller controls the electric current flown to the electromagnet as follows: the controller flows a first electric current for levitating and supporting the rotational shaft to the electromagnet to obtain a first vibration value; the controller flows a third electric current to the electromagnet at a second periodic timing to obtain a second vibration value; wherein the controller determines a second electric current and a first periodic timing based on the first vibration value, the second vibration value, the third electric current, and the second periodic timing so that the vibration is reduced to a lower level than the first vibration value; and the controller flows the second electric current to the electromagnet at the first periodic timing. Hereinafter, embodiments of the invention will be described in detail.

Figure 1:
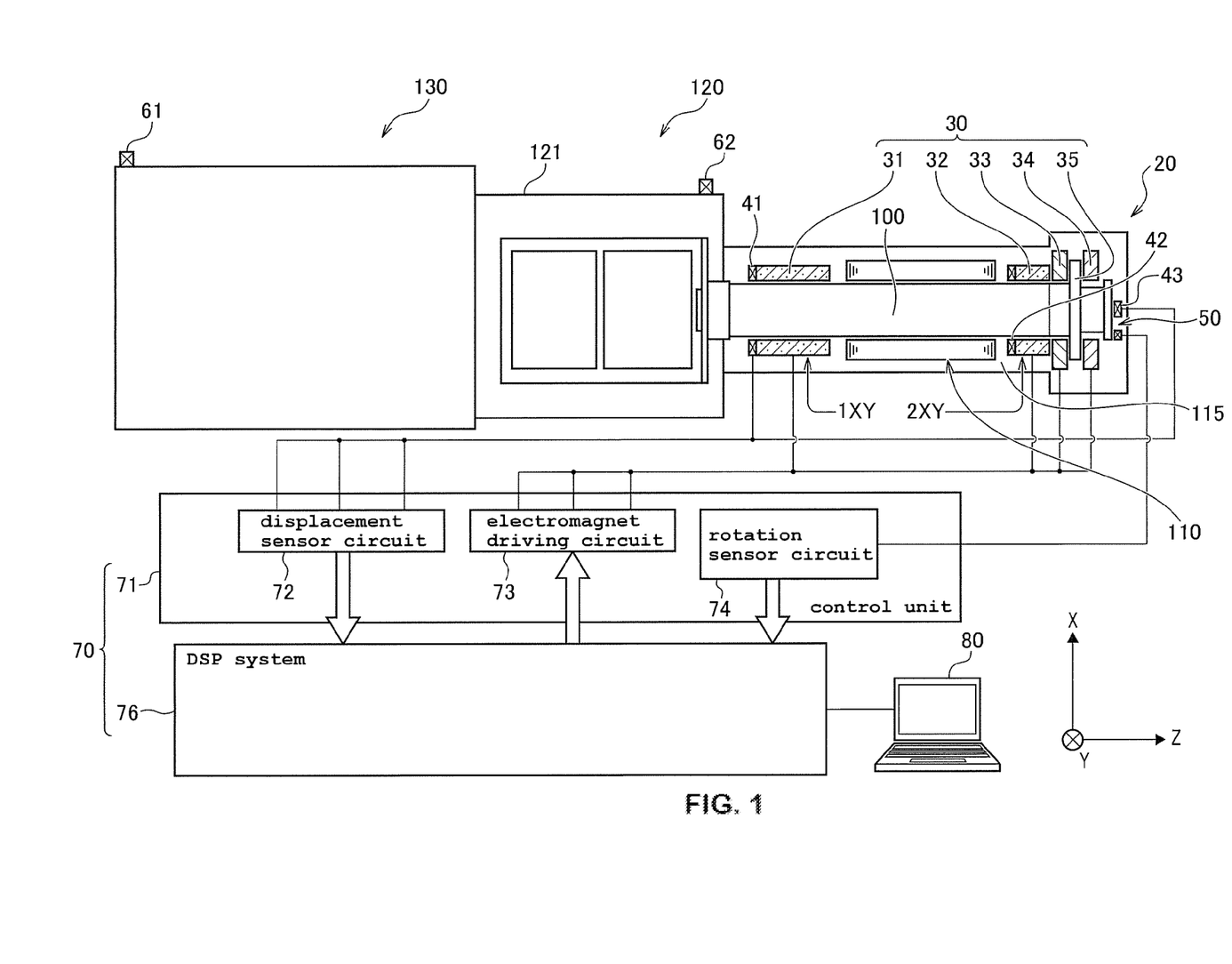
FIG. 1 is an explanatory drawing which shows a schematic configuration of a bearing apparatus as an embodiment according to the invention.

FIG. 1 shows a schematic configuration of a bearing apparatus 20 which is an embodiment according to the invention. In this embodiment, the bearing apparatus 20 supports a rotational shaft 100 of a fan 120 which generates a vacuum in a chamber 130. However, there is imposed no specific limitation on the application of the bearing apparatus 20, and hence, the bearing apparatus 20 can be applied to various rotational machines such as a pump, a compressor, a gas agitator or the like. As shown in FIG. 1, the bearing apparatus 20 includes a magnetic bearing 30, displacement sensors 41, 42, and 43, a rotation sensor 50, vibration sensors 61 and 62, and a controller 70.

The magnetic bearing 30 supports the rotational shaft 100 in a contactless fashion through magnetic levitation by using a electromagnetic force which is generated by flowing an electric current to an electromagnet. This magnetic bearing 30 includes electromagnets 31, 32, 33, and 34, and a magnetic member 35. The electromagnets 31, 32 are disposed at opposite sides of the rotational shaft 100 in the direction of an axis thereof (a Z direction) so that a motor 110 which imparts a rotational driving force to the rotational shaft 100 is disposed therebetween. These electromagnets 31, 32 constitute radial magnetic bearings which apply magnetic forces to the rotational shaft 100 in an X direction and a Y direction which intersect the Z direction at right angles. The electromagnets 33, 34 are disposed on the rotational shaft 100 at opposite sides of the magnetic member 35 having a disk shape which is provided on a circumference of the rotational shaft 100 in the Z direction so that the magnetic member 35 is disposed therebetween. The electromagnets 33, 34 and the magnetic member 35 constitute a thrust bearing which applies an electromagnetic force to the rotational shaft 100 in the Z direction. In this embodiment, the electromagnets 31, 32, 33, 34 are provided in an interior of a stator housing 115 which constitutes a common housing which also accommodates the motor 110.

The displacement sensors 41, 42 detect a displacement of the rotational shaft 100 on an X-Y plane which intersects the Z direction at right angles in positions where the electromagnets 31, 32 are provided, respectively. The displacement sensor 43 detects a displacement of the rotational shaft 100 in the Z direction at an end portion of the rotational shaft 100. The rotation sensor 50 detects the rotation of the rotational shaft 100 at the end portion of the rotational shaft 100. The motor 110 drives to rotate the rotational shaft 100 by using an inverter (not shown). It is noted that the bearing apparatus 20 may be a self-sensing magnetic bearing which obviates the necessity of the displacement sensors.

Figure 2A:
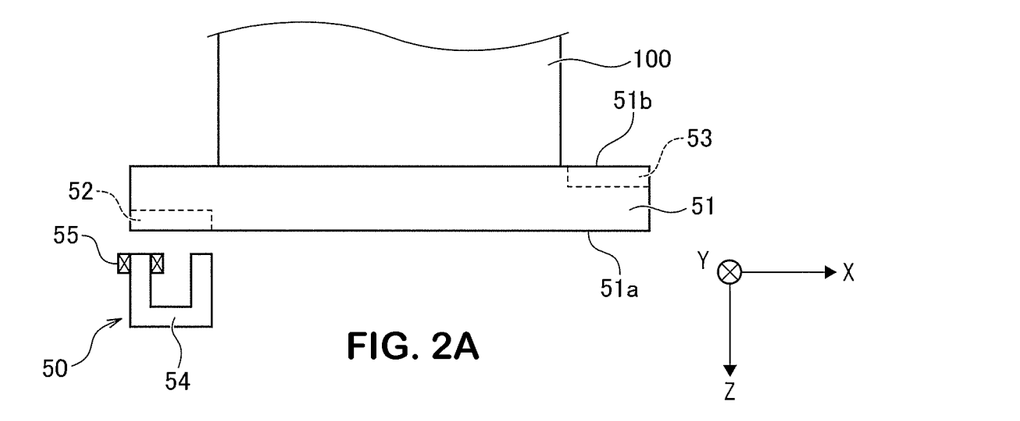
FIG. 2A and FIG. 2B are explanatory drawings which show a schematic configuration of a rotation sensor.
Figure 2B:
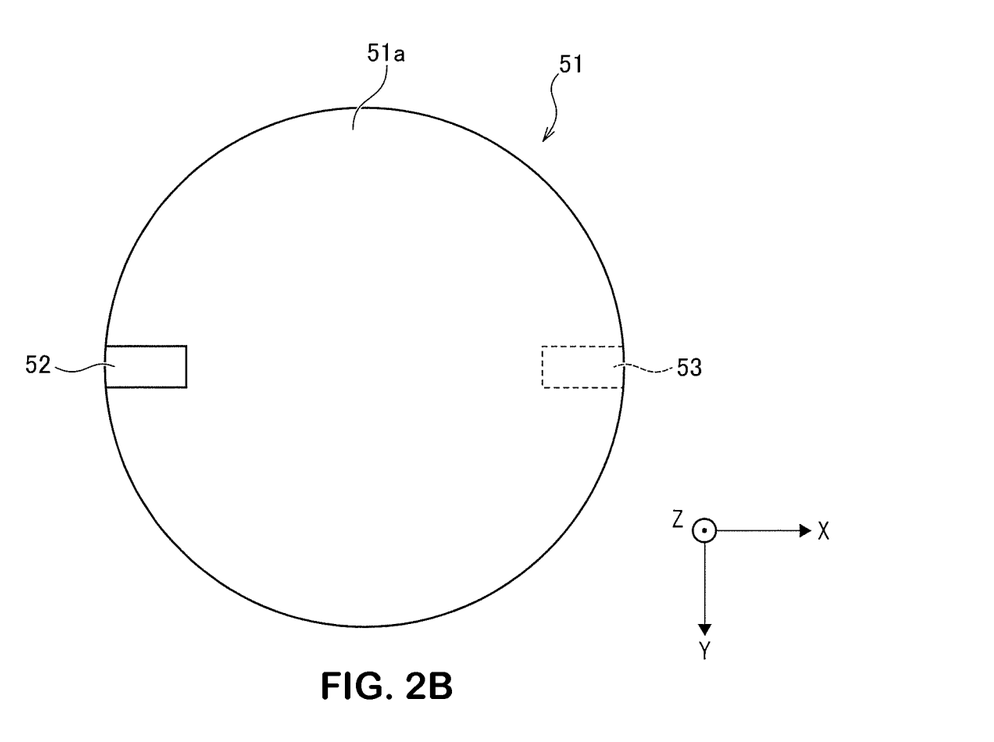

FIG. 2 shows a schematic configuration of the rotation sensor 50. As shown in FIG. 2, the rotation sensor 50 includes a disk module 51, a sensor magnetic pole 54 and a sensor coil 55. The disk module 51 is made of a magnetic material and is formed into a circular disk shape on the X-Y plane. The disk module 51 is fixed to the end portion of the rotational shaft 100. The sensor magnetic pole 54 has a U-shape and is provided so as to define a gap between the disk module 51 and itself. The sensor coil 55 is wound around one of leg portions of the U-shaped sensor magnetic pole 54. A first cutout portion 52 is formed at one radial end portion on a first surface 51a of the disk module 51. The cutout portion 52 is formed by reducing a thickness of the disk module portion 51 in the direction of an axis thereof (the Z direction). When used herein, the reduction of the thickness does not include a fact that the thickness is 0. The first cutout portion 52 is formed in a position which oppositely faces the U-shape of the sensor magnetic pole 54. The first surface 51a is a surface on a side of the disk module portion 51 which oppositely faces the sensor magnetic pole 54. A second cutout portion 53 is formed on a second surface 51b of the disk module 51 which is a side opposite to the first surface 51a. The first cutout portion 52 and the second cutout portion 53 are in a 180-degree rotational symmetric relationship about the axis of the rotational shaft 100 and have the same shape.

In the rotation sensor 50 configured in the way described above, the disc module 51 rotates together with the rotational shaft 100. A magnetic resistance as seen from the sensor coil 55 varies every time the first cutout portion 52 passes a position which lies to oppositely face the sensor magnetic pole 54, that is, every time the rotational shaft rotates a full rotation. The variation in magnetic resistance involves a variation in a magnetic flux which intersects with the sensor coil 55, and therefore, a pulse of a counter electromotive force is generated in the sensor coil 55.

As is obvious from what has been described above, the rotation sensor 50 generates a pulse every time the rotational shaft 100 rotates a full rotation. This facilitates the detection of a zero point of the rotation of the rotational shaft 100. As a result of this, a first timing, which will be described later, can be identified easily. However, it is possible to set the number of pulses generated per one full rotation of the rotational shaft 100 to two or more. In addition, in the rotation sensor 50, the second cutout portion 53 is formed in the position described above. Consequently, the weight of the disk module 51 becomes even at the radial ends thereof, and therefore, the provision of the cutout portions 52, 53 does not affect badly the rotational balance of the rotational shaft 100. The first cutout portion 52 and the second cutout portion 53 may each be filled with a non-magnetic material.

Here, returning to FIG. 1, the vibration sensors 61, 62 are provided at locations where vibration should be reduced within an influential range of vibration which is caused by the rotation of the rotational shaft 100. In this embodiment, the vibration sensors 61, 62 are acceleration sensors. The influential range of vibration includes all portions to which the vibration of the rotational shaft 100 is transmitted, and the portions include, for example, a magnetic bearing constituent component (for example, the stator housing 115), an apparatus which utilizes directly the rotation of the rotational shaft 100 (here, the fan 120), an apparatus associated with the apparatus (here, the chamber 130), and a frame (not shown) to which the apparatus is fixed. In this embodiment, the vibration sensor 61 is provided on the chamber 130, and the vibration sensor 62 is provided on a casing 121 of the fan 120. In this embodiment, the number of vibration sensors is two, however, one or more arbitrary number of vibration sensors may be provided.

The controller 70 includes a control unit 71 and a DSP (Digital signal Processor) system 76, and controls the operation of the bearing apparatus 20. The control unit 71 includes a displacement sensor circuit 72, an electromagnet driving circuit 73, and a rotation sensor circuit 74. The displacement sensor circuit 72 performs A/D conversion of outputs of the displacement sensors 41, 42, 43, and outputs the result of the conversion to the DSP system 76. The rotation sensor circuit 74 performs A/D conversion of an output of the rotation sensor 50, and outputs the result of the conversion to the DSP system 76. The DSP system 76 generates control signals of the electromagnets 31, 32, 33, 34 based on a displacement of the rotational shaft 100 which is outputted from the displacement sensor circuit 72, performs D/A conversion of the control signals, and outputs the result of the conversion to the electromagnet driving circuit 73. The electromagnet driving circuit 73 controls controlling electric currents which are supplied to the electromagnets 31, 32, 33, 34 based on the inputted control signals. The controller 70 is connected to a command computer 80 which inputs a control instruction command into the controller 70.

In this embodiment, the controller 70, which is configured to capable of controlling the magnetic bearing 30 in first to third control modes. In the first control mode, the controller 70 causes a first electric current to be supplied to the magnetic bearing 30 based on the detection result of the displacement sensor circuit 72. In the second control mode, the controller 70 causes a second electric current to be supplied to the magnetic bearing 30 based on the detection result of the displacement sensor circuit 72 and the detection results of the vibration sensors 61, 62. The second electric current is an electric current which has an electric current value resulting from adding or deducting by a first value to or from an electric current value of a first electric current in place of the first electric current. The second electric current replaces the first electric current only at a first periodic timing (hereinafter, also, referred to as a first timing) which is in synchronization with a rotation period of the rotational shaft 100 which is detected by the rotation sensor 50 so that vibration at the locations where the vibration sensors 61, 62 are placed is reduced to a lower level than vibration values which are detected by the vibration sensors 61, 62 in the first control mode. When used herein, the timing denotes an arbitrary angle in angles from 0 to 360 degrees with respect to a reference angle (a reference phase angle) which is detected by the rotation detection sensor 50 when seen on a plane which rotates together with the rotational shaft 100. The reference angle of the rotational shaft 100 can be detected by the rotation sensor 50. In this embodiment, the first timing is a predetermined timing whose period is equal to the rotation period of the rotational shaft 100. However, the first timing may be a predetermined timing whose period is an integral multiple of the rotation period of the rotational shaft 100. As described above, the first timing can be taken as the rotation angle of the rotational shaft 100. This first timing can easily be identified from the detection result of the rotation sensor circuit 74 and time information (a timer counter) which is prepared separately in the DSP system 76.

As is obvious from what has been described above, the second control mode is a control mode in which the rotational shaft 100 is vibrated to correct the unbalanced amount of the rotational shaft 100. In this embodiment, balancing planes are a first balancing plane 1XY which corresponds to the electromagnet 31 and which is perpendicular to the Z direction and a second balancing plane 2XY which corresponds to the electromagnet 32 and which is perpendicular to the Z direction. Here, for example, the second electric current in the second control mode apply a radial force which is in synchronization with the rotation of the rotational shaft 100 to the rotational shaft 100 by causing a cosine-wave electric current and a sine-wave electric current whose periods are the same as the rotation period of the rotational shaft 100 to the electromagnet which controls the direction of an X-axis and the electromagnet which controls the direction of a Y-axis on the first balancing plane 1XY and the second balancing plane 2XY, so as to correct the unbalanced amount of the rotational shaft 100. The periods of the cosine-wave electric current and the sine-wave electric current may be an integral multiple of the rotation period. Additionally, they may each be a value resulting from addition of a plurality of electric currents whose periods are integral multiples of the rotation period. Alternatively, the electric current may be flown only to one of the electromagnet which controls the direction of the X-axis and the electromagnet which controls the direction of the Y-axis. The control of the timing is implemented by offsetting the phases of the cosine-wave electric current and the sine-wave electric current. The second electric current can, of course, reverse the rotational direction of the radial force applied to the rotational shaft 100 by flowing the sine-wave electric current in the direction of the X-axis and by flowing the cosine-wave electric current in the direction of the Y-axis. The rotational direction of the radial force applied by the second electric current should be selected in accordance with the rotational direction of the rotational shaft 100. Although the first electric current of the first control mode and the electric current (the first electric current) of the second electric current in the second control mode which flow at other timings than the first timing are not the same, in this embodiment, electric currents which are determined based on the displacement (which may be an estimated value) of the rotational shaft 100 but not based on the detection results of the vibration sensors 61, 62 are all referred to as the "first electric current."

The third control mode is a control mode which determines the electric current value of the second electric current and the first timing. In the third control mode, the controller 70 causes a third electric current which has an electric current value resulting from adding or deducting by a second value to or from the electric current value of the first electric current to be supplied to the magnetic bearing 30 in place of the first electric current only at a second periodic timing (hereinafter, referred also to as a second timing) which is in synchronization with the rotation period of the rotational shaft 100. The third electric current is generated in the same manner as the second electric current. This control is a control to apply a trial vibrating force to the magnetic bearing 30. The second value can be set to an arbitrary value which allows the electric current value of the third electric current to be larger than zero. Additionally, the second timing can be set to an arbitrary rotation angle.

In this embodiment, the electric current value of the second electric current and the first timing are determined by the system 76 by using an influence coefficient method. Although a detailed description of the influence coefficient method will be omitted here since the method is generally known, to describe the influence coefficient method briefly, firstly, influence coefficients $\alpha 11$, $\alpha 12$, $\alpha 21$, $\alpha 22$ are calculated from vibration values A1, A2 which are detected by the vibration sensors 61, 62, respectively, when controlling the magnetic bearing 30 in the first control mode, vibration values B11, B12 which are so detected when trial vibration is applied to the balancing plane 1XY by flowing the third electric current when controlling the magnetic bearing 30 in the third control mode, an unbalanced amount U01 which is applied to the balancing plane 1XY then, vibration values B21, B22 which are so detected when trial vibration is applied to the balancing plane 2XY when controlling the magnetic bearing 30 in the third control mode, and an unbalanced amount U02 which is applied to the balancing plane 2XY then. The influence coefficients $\alpha 11$, $\alpha 12$, $\alpha 21$, $\alpha 22$ are expressed by the following expressions (1) to (4), respectively.

$$\alpha 11 = (B11 - A1)/U01 \tag{1}$$

$$\alpha 12 = (B12 - A1)/U02 \tag{2}$$

$$\alpha 21 = (B21 - A2)/U01 \tag{3}$$

$$\alpha 22 = (B22 - A2)/U02 \tag{4}$$

Next, unbalanced amounts U1, U2 (U1 and U2 are unbalanced amounts to be applied to the rotor on two balancing planes in the first control mode, which is a initial control mode, for reducing two vibrations detected by the vibration sensors to zero) are obtained which satisfy the following expressions (5), (6). U1 is an unbalanced amount of the first balancing plane 1XY which is to be vibrated in the second control mode, and U2 is an unbalanced amount of the second balancing plane 2XY which is to be vibrated in the second control mode. It is noted that since $\alpha 11$, $\alpha 12$, $\alpha 21$, $\alpha 22$, A1, A2, B11, B12, B21, B22, U01, U02, U1 and U2 all have information on magnitude and rotation angle, they are treated as complex numbers.

$$A1 + \alpha 11 \times U1 + \alpha 12 \times U2 = 0 \tag{5}$$

$$A2 + \alpha 21 \times U1 + \alpha 22 \times U2 = 0 \tag{6}$$

Next, a magnitude of vibration and a rotation angle (a first timing) are obtained by complex number calculations. Then, an electric current value of the second electric current is obtained from the magnitude of vibration. As is obvious from the expressions (5), (6), in this embodiment, the electric current value of the second electric current and the first timing are determined so that vibrations at all of the setting locations of the vibration sensors 61, 62 are minimized (theoretically zero). This can reduce remarkably the vibrations at the setting locations of the vibration sensors 61, 62. However, right terms in the expressions (5), (6) can be set to arbitrary values which are smaller than the vibration values A1, A2. It is noted that when the number M (M is an integer which is equal to or larger than one) of balancing planes and the number N (N is an integer which is equal to or larger than one) of vibration sensors satisfy N≤M, it is possible to obtain the unbalanced amounts U1, U2 which allow the vibrations at all of the setting locations of the vibration sensors 61, 62 to are minimized, as described above.

The first to third control modes are switched over as follows by the controller 70, for example. Firstly, the controller 70 obtains vibration values in the first control mode after the rotation speed of the rotational shaft 100 reaches a rated rotation speed (a specific rotation speed to be controlled) when the fan 120 is started and the rotational shaft 100 starts to rotate. Next, the controller 70 switches the control modes from the first control mode to the third control mode to determine the electric current value of the second electric current and the first timing. In the third control mode, one rated rotation speed which is the same as that of the first control mode is also used. Next, the controller 70 switches the control modes from the third control mode to the second control mode to execute the control using the electric current value of the second electric current and the first timing which are so determined.

The information which can identify the once-determined electric current value of the second electric current and first timing may be stored in a storage medium by the controller 70. The storage medium may be provided in or connected to the controller 70, and in the latter case, the storage medium may be, for example, a storage medium provided in the command computer 80. In this case, the controller 70 may execute the control in the second control mode by using the electric current value of the second electric current and the first timing which are identified from the information stored in the storage medium when the fan 120 is started in the second time or later. Namely, the control in the third control mode may be omitted. By doing so, it is possible to reduce vibration quickly when the fan 120 is started in the second time or later. Further, when vibration is detected by the vibration sensors 61, 62 during the control in the second control mode to find that detected vibration values exceed a specified range, the controller 70 may correct the electric current value of the second electric current and the first timing by the third control mode.

According to the bearing apparatus 20 which has been described heretofore, by setting at least one vibration sensor at the location where vibration should be reduced within the influential range of vibration generated by the rotation of the rotational shaft 100, vibration at a desired location can preferably be reduced when the fan 120 is driven at a predetermined rotation speed. Since the vibration which is caused by the whirling of the rotational shaft 100 is generated as a wave which is in synchronization with the rotation period of the rotational shaft 100, it is possible to reduce effectively the vibration caused by the whirling of the rotational shaft 100. In addition, the electric current value of the second electric current and the first timing can be optimized easily by the influence coefficient method. Additionally, since the balancing can be implemented without depending upon the mechanical balancing, the imbalance of the rotational shaft 100 can be corrected easily even when only a narrow space is available, when it is difficult to expose the balancing plane, or when a person cannot touch the balance balancing plane due to the polluted environment.

Figure 3:
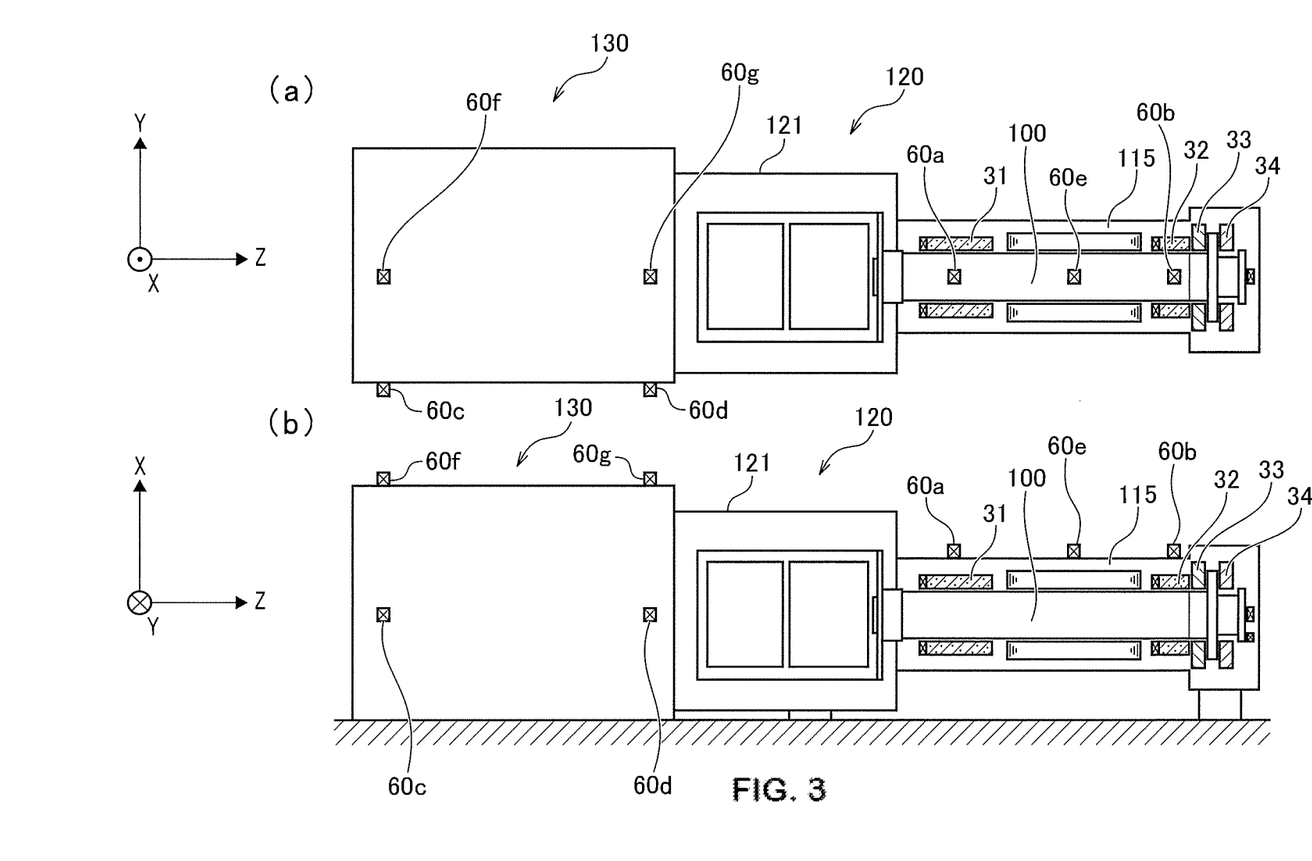
FIG. 3 is an explanatory drawing which shows a mounting position of a vibration sensor in a vibration evaluation test.

A vibration evaluation test which was carried out to verify the effectiveness of the bearing apparatus 20 will be described below. FIG. 3 shows mounting positions of vibration sensors 60 in a vibration evaluation test which employed the bearing apparatus 20. As shown in the figure, in this test, vibration sensors 60a to 60g were mounted in mounting positions a to g, respectively. The mounting positions a, b, e were on an external surface of the stator housing 115, and the mounting positions c, d, f, g were on external surfaces of the chamber 130.

Figure 4:
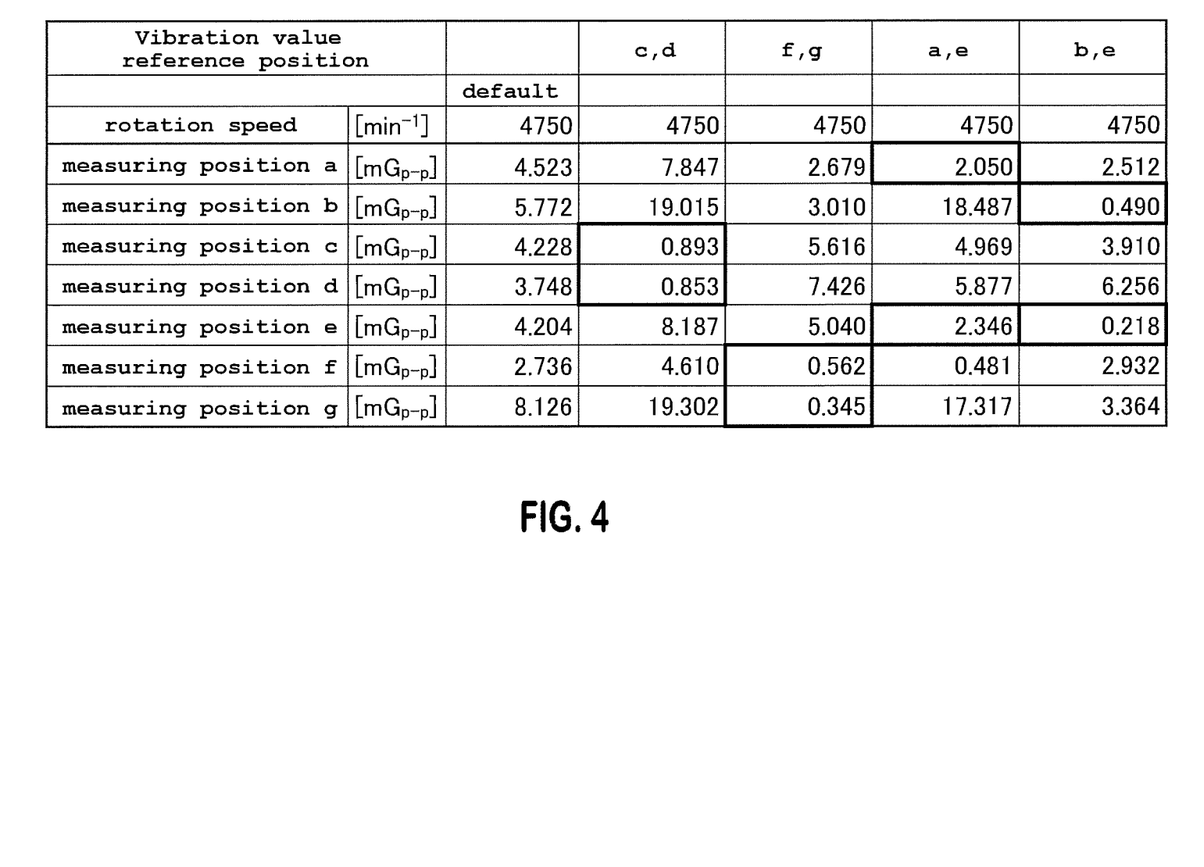
FIG. 4 is a table which shows the results of the vibration evaluation test.

FIG. 4 shows the results of the vibration evaluation test. When the two mounting positions c, d are referred to as vibration reference positions, that is, when vibration is reduced in the first to third control modes based on the detection results of the vibration sensors 60c, 60d of the vibration sensors 60a to 60g, it is seen that vibration values of the mounting positions (measuring positions) c, d are reduced remarkably from a default value (a value detected in the control in the first control mode). Vibration values at the mounting positions a, b, e, f, g are those which were detected to grasp changes in vibration at the other mounting positions than the mounting positions c, d and are not used for the influence coefficient method. As in the case where the mounting positions c, d are referred to as the vibration value reference positions, it is seen that vibration values at the mounting positions are reduced remarkably from the default value in any of cases where the mounting positions f, g are referred to as the vibration value reference positions, the mounting positions a, e are referred to as the vibration value reference positions, and the mounting positions b, e are referred to as the vibration value reference positions.

B. Modifications

B-1. Modification 1

The number of balancing planes is not limited to two and hence may be one or three or more. Additionally, the correction of the imbalance of the rotational shaft 100 is not limited to the correction only at the radial magnetic bearings and hence may be carried out at the thrust bearing.

When the number M (M is an integer equal to or larger than one) of balancing planes and the number N (N is an integer equal to or larger than one) of vibration sensors satisfy N>M, in the influence coefficient method, it is not possible to obtain the unbalanced amounts U1, U2 by which vibrations at all of setting locations of those N vibration sensors become zero theoretically. In this case, the unbalanced amounts U1, U2 may be obtained as values which allow a sum of squares of a vibration value at each of the setting locations of the N vibration sensors measured during the control in the second control mode to be minimized. By adopting this approach, it is also possible to reduce remarkably the vibration at each of those setting locations. In this case, the influence coefficients used in the influence coefficient method may be weighted in a predetermined fashion. By adopting this approach, vibrations at the setting locations of the vibration sensors can be reduce in a more flexible fashion so as to match the degree of importance of the individual setting locations of the vibration sensors (the order of priority in reduction of vibration).

B-2. Modification 2

The controls in the first control mode and the third control mode may be executed so as to deal with two or more different rotation speeds. In this case, when the number M (M is an integer equal to or larger than one) of balancing planes, the number N (N is an integer equal to or larger than one) of vibration sensors and the number R of kinds of set rotation speeds satisfy N×R≤M, the unbalanced amounts U1, U2 may be obtained as values which allow vibration values at all setting locations of vibration sensors to be minimized (theoretically zero) under each of operating conditions of the R kinds of different rotation speeds. On the other hand, when the number M, the number N and the number R satisfy N×R>M, as described in Modification 1 above, the unbalanced amounts U1, U2 may be obtained as values which allow a sum of squares of a vibration value at each of the setting locations of the N vibration sensors and under each of the R kinds of different rotation speeds measured during the control in the second control mode to be minimized. By adopting this approach, the control in the second control mode enable the vibration values to reduce remarkably according to the conditions of M, N and R in the second control mode under any of operating conditions of plural kinds of different rotation speeds.

B-3. Modification 3

The electric current value of the second electric current and the first timing may be determined by other methods than the influence coefficient method. For example, in the third control mode, the controller 70 may execute detections at the vibration sensors 61, 62 while changing the second timing and the second value by a predetermined number of times, and adopt the second timing and the second value at which the detected vibration values become relatively small as the first timing and the first value. By adopting even this approach, the vibration can be reduced simply and easily.

While the aspects for practicing the invention has thus been described based on some embodiments and modifications, the aspects for practicing the invention described above is intended to facilitate the understanding of the invention and hence is not intended to limit the invention. Various modifications and/or improvements can be made thereto without departing from the spirit and scope of the invention, and the resulting equivalents are, of course, included in the invention. In addition, the constituent components or elements described in the specification and/or claims can arbitrarily be combined together or omitted as long as at least part of the problem described above can be solved or at least part of the advantage described above can be provided.

What is claimed is:

1. A magnetic bearing apparatus for supporting a rotational shaft, the magnetic bearing apparatus comprising:
    a magnetic bearing for supporting the rotational shaft in a contactless fashion through magnetic levitation by using an electromagnetic force which is generated by an electric current flown to an electromagnet;
    a rotation sensor for detecting the rotation of the rotational shaft;
    a controller for controlling the electric current flown to the electromagnet; and
    at least one vibration sensor which is provided within an influential range of vibration which is generated by the rotation of the rotational shaft, wherein
    the controller controls the electric current flown to the electromagnet as follows:
in a first control mode, a first electric current is flown to the electromagnet for levitating and supporting the rotational shaft; and
in a second control mode, a second electric current is flown to the electromagnet in place of the first electric current at a first periodic timing which is detected by the rotation sensor so that vibration is reduced to a lower level than a first vibration value detected in the first control mode in at least one of setting location of the at least one vibration sensor.

2. The magnetic bearing apparatus according to claim 1, wherein
    the controller controls the electric current flown to the electromagnet in a third control mode in which a third electric current which has an electric current value resulting from adding or deducting by a second value to or from the electric current value of the first electric current is flown to the electromagnet in place of the first electric current at a second periodic timing, and
    the controller determines an electric current value of the second electric current and the first periodic timing by using an influence coefficient method based on the first vibration value; a second vibration value which is detected by the vibration sensor during the control in the third control mode; and the second value and the second periodic timing.

3. The magnetic bearing apparatus according to claim 2, wherein
    based on the first vibration value which is detected under an operating condition with the rotational shaft rotating at one rotational speed; the second vibration value which is detected by the vibration sensor under the operating condition with the rotational shaft rotating at the one rotation speed during the control in the third control mode; and the second value and the second periodic timing,
    when the number M (M is an integer equal to or larger than one) of balancing planes where unbalanced amount of the rotational shaft is corrected by using the electric current value of the second electric current and the first periodic timing in the second control mode and the number N (N is an integer equal to or larger than one) of the vibration sensor satisfy N≤M,
    the controller determines the electric current value of the second electric current and the first periodic timing so that the vibration value is minimized at all of the setting location of the at least one vibration sensor.

4. The magnetic bearing apparatus according to claim 2, wherein
    based on the first vibration value which is detected under an operating condition with the rotational shaft rotating at one rotational speed; the second vibration value which is detected by the vibration sensor under the operating condition with the rotational shaft rotating at the one rotation speed during the control in the third control mode; and the second value and the second periodic timing,
    when the number M (M is an integer equal to or larger than one) of balancing planes where unbalanced amount of the rotational shaft is corrected by using the electric current value of the second electric current and the first periodic timing in the second control mode and the number N (N is an integer equal to or larger than one) of the vibration sensor satisfy N>M,
    the controller determines the electric current value of the second electric current and the first periodic timing so that a sum of squares of a vibration value at each of setting locations of N vibration sensors during the control in the second control mode under the operating condition with the rotational shaft rotating at the one rotation speed is minimized.

5. The magnetic bearing apparatus according to claim 4, wherein
    the controller determines the electric current value of the second electric current and the first periodic timing by weighting an influence coefficient used in the influence coefficient method.

6. The magnetic bearing apparatus according to claim 2, wherein
    based on the individual first vibration values detected under individual operating conditions with the rotational shaft rotating at R (R is an integer equal to or larger than two) kinds of different rotation speeds; the individual second vibration values detected by the vibration sensor under the individual operating conditions with the rotational shaft rotating at the R kinds of different rotation speeds in the control in the third control mode; and the second value and the second periodic timing,
    when the number M (M is an integer equal to or larger than one) of balancing planes where unbalanced amount of the rotational shaft is corrected by using the electric current value of the second electric current and the first periodic timing in the second control mode, the number N (N is an integer equal to or larger than one) of the vibration sensor, and the R satisfy N×R≤M,
    the controller determines the electric current value of the second electric current and the first periodic timing so that the vibration value is minimized at all of the setting location of the at least one vibration sensor and under the individual operating conditions with the rotational shaft rotating at R kinds of different rotation speeds.

7. The magnetic bearing apparatus according to claim 2, wherein
    based on the individual first vibration values detected under individual operating conditions with the rotational shaft rotating at R (R is an integer equal to or larger than two) kinds of different rotation speeds; the individual second vibration values detected by the vibration sensor under the individual operating conditions with the rotational shaft rotating at the R kinds of different rotation speeds in the control in the third control mode; and the second value and the second periodic timing, when the number M (M is an integer equal to or larger than one) of balancing planes where unbalanced amount of the rotational shaft is corrected by using the electric current value of the second electric current and the first periodic timing in the second control mode, the number N (N is an integer equal to or larger than one) of the vibration sensor, and the R satisfy N×R>M, the controller determines the electric current value of the second electric current and the first periodic timing so that a sum of squares of a vibration value at each of setting locations of N vibration sensors and under each of the individual operating conditions with the rotational shaft rotating at R kinds of different rotation speeds during the control in the second control mode is minimized.

8. The magnetic bearing apparatus according to claim 2, wherein when determining the electric current of the second electric current and the first periodic timing by the third control mode, the controller stores information which can identify the electric current value of the second electric current and the first periodic timing in a storage medium, the controller executes the control in the second control mode by using the electric current value of the second electric current and the first periodic timing which are identified from the information stored in the storage medium when the rotation speed of the rotational shaft reaches a rated rotational speed after the rotational shaft is started to rotate.

9. The magnetic bearing apparatus according to any of claims 1 to 8, wherein the rotation sensor is configured to generate one pulse every time the rotational shaft rotates a full rotation.

10. The magnetic bearing sensor according to claim 9, wherein the rotation sensor comprises:

a disk module which is fixed to the rotational shaft, the disk module being formed into a circular disk shape in a direction perpendicular to the rotational shaft, and the disk module being made of a magnetic material;

a sensor magnetic pole which is provided so as to face oppositely the disk module with a gap defined therebetween; and a sensor coil which is wound around the sensor magnetic pole, a first cutout portion where a thickness of the disk module in the direction of an axis thereof is reduced is formed on a first surface which is a surface of a side of the disk module which faces oppositely the sensor magnetic pole, a second cutout portion having the same shape as that of the first cutout portion is formed on a second surface which is a surface of a side of the disk module which is opposite to the first surface in a position which is 180 degrees rotationally symmetric with the first cutout portion about the axis.

11. A method for reducing vibration caused by a magnetic bearing apparatus which supports a rotational shaft, the method comprising:

(i) supporting the rotational shaft in a contactless fashion through magnetic levitation by flowing a first electric current with which the rotational shaft is levitated and supported to an electromagnet of the magnetic bearing apparatus and using an electromagnetic force which is generated by the first electric current flown to the electromagnet;

(ii) detecting vibration by at least one vibration sensor which is provided within an influential range of vibration which is generated by the rotation of the rotational shaft in the (i) supporting the rotational shaft; and (iii) supporting the rotational shaft in a contactless fashion through magnetic levitation by flowing a second electric current to the electromagnet in place of the first electric current and using an electromagnetic force generated by the second electric current flown to the electromagnet at a predetermined periodic timing so that vibration is reduced to a lower level than a vibration value detected during the (i) supporting the rotational shaft in at least one of setting location of the at least one vibration sensor, the second electric current having an electric current value resulting from adding or deducting by a specific value to or from an electric current value of the first electric current.

12. A magnetic bearing apparatus for supporting a rotational shaft, the magnetic bearing apparatus comprising:

a magnetic bearing for supporting the rotational shaft in a contactless fashion through magnetic levitation by using an electromagnetic force which is generated by an electric current flown to an electromagnet;

a rotation sensor for detecting the rotation of the rotational shaft;

a controller for controlling the electric current flown to the electromagnet; and at least one vibration sensor which is provided within an influential range of vibration which is generated by the rotation of the rotational shaft, wherein the controller controls the electric current flown to the electromagnet as follows:

the controller flows a first electric current for levitating and supporting the rotational shaft to the electromagnet to obtain a first vibration value;

the controller flows a third electric current to the electromagnet at a second periodic timing to obtain a second vibration value; wherein the controller determines a second electric current and a first periodic timing based on the first vibration value, the second vibration value, the third electric current, and the second periodic timing so that the vibration is reduced to a lower level than the first vibration value; and the controller flows the second electric current to the electromagnet at the first periodic timing.

* * * * *